United States Patent Office

3,508,966
Patented Apr. 28, 1970

3,508,966
ELECTROCHEMICAL CELL WITH NON-AQUEOUS ELECTROLYTE
Morris Eisenberg, Palo Alto, Calif., assignor to Electrochimica Corporation, a corporation of California
No Drawing. Filed May 22, 1967, Ser. No. 640,335
Int. Cl. H01m 35/00
U.S. Cl. 136—6     11 Claims

ABSTRACT OF THE DISCLOSURE

A non-aqueous electrolyte for use in rechargeable electrochemical cells wherein the active anode material is a metal selected from the group consisting of lithium, sodium, calcium and magnesium and the active cathode material is a halide of a metal selected from the group consisting of copper, silver, iron, nickel and cobalt. The electrolyte contains a solute that is a Lewis acid of the class having a metal cation of an element selected from groups IIIa and Va of the periodic table of elements, and a halide anion; a coordinating compound capable of forming a complex with a selected one of said Lewis acids; a saturator salt which is a metal halide having a cation of the same specie as the active anode material and an anion of the same specie as the halide of said active cathode material. The saturator salt is provided in sufficient quantity to form a saturated solution in the electrolyte; and a non-aqueous solvent is provided for the solute, coordinating compound and saturator salt which is substantially non-reactive chemically with the anode and cathode. In an alternative embodiment of my invention, the Lewis acid and coordinating compound is replaced by a solute selected from the group consisting of salts having a cation selected from the elements of groups Ia and IIa of the periodic table of elements, and an anion selected from the group consisting of perchlorate and the ion formed by a Lewis acid of the class described above in coordination with a simple halide anion of the same specie as the halide of the Lewis acid.

---

To achieve energy densities of a higher level than those feasible with conventional batteries, the use of light-weight and high electromotive force alkali metals as anode materials is desirable. Because of the high chemical activity of such alkalis, aqueous electrolytes generally cannot be employed. Instead, organic solvents of good stability capable of dissolving salts and yielding conductive electrolyte solutions have been sought.

Heretofore, such high energy batteries employing organic or non-aqueous electrolytes have encountered certain disadvantages. Among these the difficulty of providing an electrolyte compatible with a cell system capable of being recharged after a period of use, during which period the electrolyte is required to possess a reasonably high level of conductivity. Still another and related problem has been to provide suitable non-aqueous electrolytes in which neither the cathode nor the anode material is soluble and with which such electrodes are substantially non-reactive chemically.

Thus, it is an object of this invention to provide a non-aqueous electrolyte for use in rechargeable electrochemical cell wherein the active anode material may comprise one of the so-called non-noble, and more particularly the alkali, metals such as lithium, sodium, calcium and magnesium.

It is a further object of this invention to provide a non-aqueous electrolyte for use in electrochemical cells as characterized above wherein such electrolyte is relatively chemically inert to the active material of both the anode and the cathode and in which such electrodes are relatively insoluble.

To achieve the foregoing, I have discovered a class of electrolytes, and a method for preparing them, set forth in some detail in the following specification. Further, it is believed that a reading of this specification by one of ordinary skill in the art will indicate numerous other objects, features and advantages in my invention.

Broadly speaking, my invention embraces an electrolyte comprising a solute which is a Lewis acid of the class having a metal cation of an element selected from groups IIIa and Va of the periodic table of elements, and a halide ion, hereafter sometimes referred to simply as a Lewis acid, a coordinating compound capable of forming a complex with a selected one of the Lewis acids; a so-called saturator salt which is a metal halide having a cation of the same specie as said active anode material and an anion of the same specie as the halide of said active cathode material. The saturator salt, which to a degree provides the feature of my invention whereby the active anode material is prevented from being dissolved in the electrolyte, is introduced in sufficient quantity to form a saturated solution thereof in the electrolyte. I provide the aforementioned solute, coordinating compound, and saturated salt in a non-aqueous solvent which is substantially non-reactive chemically with the anode and cathode materials of the cell for which such electrolyte is furnished.

It is a particular feature of this invention that the electrolyte thereof is also one which exhibits a relatively high degree of conductivity; and I have found that this may be enhanced by the particular selection of coordinating compound from among the variety thereof that could be used with various Lewis acids. Although a number of such compounds may be used in my invention, I prefer the particular selection from the group consisting of a simple sodium salt having a halide cation. More particularly, I find it desirable to select the sodium salt whose halide is of the same specie as the anion of the particular Lewis acid selected, and that such coordinating compound be present in the electrolyte in an amount sufficient so that the mole per liter concentration thereof is at least as great as that of the Lewis acid.

To illustrate the foregoing and other aspects of my invention, I set forth the following as a first example of a cell in accordance with my invention which I have found to operate satisfactorily.

EXAMPLE I

A set of lithium anodes supported on 100 mesh nickel screen interspersed with cupric chloride cathode. The cathode consists of copper or nickel or Monel screen onto which is pressed a cathode mix containing 80 percent $CuCl_2$ anhydrous powder, 10 percent acetylene black and 10 percent silver flake, and a fraction of a percent polyethylene as a binder. The separator system consists of two layers of non-woven polypropylene material interposed with one or more layers of a micro-porous polyvinyl chloride sheet. The electrode separators are formed in a pack with cathodes attached to the positive terminal and the anodes to the negative terminal of the cell. The cell pack is inserted in a plastic case made of epoxy and filled in a dry atmosphere box with an electrolyte comprising 2.5 moles per liter aluminum chloride, $AlCl_3$ and 2.5 moles per liter sodium chloride dissolved in pure nitromethane and saturated thereafter with lithium chloride, the latter being the so-called saturator salt. Upon application, I have found that a cell fabricated in accordance with the foregoing gives the following performance:

Upon application of a load current corresponding to a current density of 10 milliamps (10 ma./cm.²) per square centimeter, the initial cell voltage was 2.5 volts compared to an open circuit voltage at room temperature of 3.1 volts. Continuous discharge of the cell to a 1.0 volt cut-off point yielded 83 percent faradaic efficiency for the cathode reactant material $CuCl_2$.

In the foregoing example, I employ a cathode material which is a chloride, more particularly $CuCl_2$. In this connection, it should be noted that the saturator salt, LiCl, is selected to have an anion of the same specie as the halide of the active cathode material and a cation of the same specie as the active anode material. Although in the example given, I have utilized the particular Lewis acid, $AlCl_3$, having a concentration of 2.5 moles per liter, I have found that a satisfactory range for such Lewis acid concentration is 1.5 to 2.8 moles per liter. Also, in the example given, I utilize nitromethane as the solvent for the Lewis acid, coordinating salt, and saturator salt; but I have found that other mixtures may be used; for example, nitromethane and propylene carbonate in the range of 5 percent to 25 percent by volume of the total amount of the solvent may be used and appears to have certain advantages, for example, improvement of the total conductivity of the electrolyte while still retaining the desired feature of neither dissolving or chemically reacting with either of the electrodes.

To further illustrate the foregoing, I offer the following example of a cell embodying the electrolyte of my invention and giving satisfactory results.

EXAMPLE II

A set of lithium anodes supported on 100 mesh nickel screen are interspersed with silver chloride cathodes. The cathode consists of copper, nickel or Monel screen onto which is pressed a cathode mix containing 85 percent AgCl, 10 percent carbon, 5 percent silver flake, and a fraction of a percent of polyethylene as a binder. The separator system is the same as that described in Example I above. The cell pack is inserted into a plastic case made of epoxy, and the cell is filled in a dry atmosphere box with an electrolyte comprising 2.25 moles per liter $AlCl_3$, and 2.4 moles per liter NaCl, both dissolved in a mixture of solvents consisting of 80 percent by volume nitromethane and 20 percent by volume propylene carbonate subsequently saturated with and in respect to lithium chloride.

In the foregoing example, I have utilized an active cathode material which is a chloride. My invention may also be utilized where such cathode material is fluoride. In such case, it is necessary to use a saturator salt, in accordance with my invention, wherein the anion thereof is of the fluoride specie.

In another aspect of my invention, I utilize a solute selected from the group consisting of salts having a cation selected from the elements of Group Ia and Group IIa of the Periodic Table of elements, and an anion selected from the group consisting of perchlorate or the ion formed by a Lewis acid of the class described hereinabove in coordination with a simple halide anion of the same specie as the halide of the Lewis acid employed. As before, I also add a saturator salt which is a metal halide having a cation of the same specie as the active anode material of the cell and an anion of the same specie as the halide of the active cathode material. The saturator salt is provided in sufficient quantity to form a saturated solution thereof in the electrolyte which also employs a non-aqueous solvent for dissolving the solute and saturator salt, such solvent being selected from the class thereof which is substantially non-reactive chemically with the anode and cathode. In the usual case, in this embodiment utilizing my invention, I employ an active cathode material which is a fluoride. To illustrate, I offer the following two examples of cells which I have found to operate satisfactorily.

EXAMPLE III

A set of lithium anodes supported on 100 mesh nickel screen interspersed with cupric fluoride ($CuF_2$) cathodes. The cathodes consist of copper, nickel, or Monel screen onto which is pressed a cathode mix containing 75 percent $CuF_2$, 12 percent silver flake, 12 percent acetylene black, and 1 percent polyethylene as a binder. The separator consists of two layers of non-woven polypropylene interposed with two layers of nicro-porous polyethylene barrier separator. The electrolyte consists of 1.5 moles per liter lithium perchlorate dissolved in pure propylene carbonate and saturated with lithium fluoride.

In the foregoing example, I have used pure propylene carbonate as the solvent, but satisfactory results may be obtained wherein the solvent consists of at least one member selected from the group consisting of nitromethane, nitroethane, nitropropane, propylene carbonate, and butyro-lactone. Moreover, I have indicated a particular concentration of $LiClO_4$, namely 1.5 moles per liter; but I have found that satisfactory results may be obtained with the $LiClO_4$ having a concentration in the range of 1.0 to 2.5 moles per liter, the particular concentration being a matter of choice for certain applications, where different solvent mixtures have been selected due to other cell operating conditions. Such variation in solute concentration is illustrated in the following examples along with other variations of cell design within the scope of my invention.

EXAMPLE IV

A set of lithium anodes supported on 100 mesh nickel screen interspersed with cathodes constructed in accordance with Example III except utilizing a cathode mix comprising 75 percent nickel fluoride, 12 percent silver flake, 12 percent acetylene black, and a 1 percent polyethylene binder. The separator is the same as that described hereinabove for Example III. The electrolyte consists of two moles per liter $NaPF_6$ dissolved in a mixture of 75 percent by volume nitromethane and 25 percent by volume propylene carbonate, the solution thus formed being subsequently saturated with LiF.

In both of the above Examples III and IV, the active anode material is lithium and the cathode includes a fluoride salt; so, in accordance with my invention, the saturator salt is selected to be lithium fluoride. More specifically, in Example IV above, the concentration therein of $NaPF_6$ is 2 moles per liter, using a mixture of nitromethane and propylene carbonate wherein the latter is 25 percent by volume of the total solvent present. When $NaPF_6$ is used as the solute in a concentration range of 0.5 to 1.5 moles per liter, I have found that pure propylene carbonate or nitromethane is a satisfactory solvent; when the concentration of $NaPF_6$ is elevated beyond 1.5 moles per liter, through and including 2.5 moles per liter, I have found that pure nitromethane or a mixture of nitromethane and propylene carbonate, the latter in the range of 50 percent to 90 percent by volume of the total amount of the solvent, is satisfactory. The choice of solvents in the foregoing is a matter of choice depending on the particular cell requirements.

At least two further examples embodying my invention should be noted at this time. In embodiments typified by Examples I and II, hereinabove, reference is made to the use of pure nitromethane or a mixture thereof with propylene carbonate in the range of 5 percent to 25 percent by volume of the total amount of solvent. I have also found that in certain applications involving cells of the general type exemplified by Examples I and II, a solvent of pure propylene carbonate may be used. Such a cell is of a type similar to that described above in Example I except that the particular concentration of $AlCl_3$ is limited to about .8 mole per liter; the coordinating compound of sodium chloride is also about .8 mole per liter; and the saturator salt again is LiCl in amounts sufficient to saturate the electrolyte. Cells of this type have particular application in certain special environments.

Cells of the type exemplified in Example IV above may also utilize the electrolyte of my invention wherein the use of $NaPF_6$ may be substituted by a similar salt, namely $LiPF_6$.

The following tables illustrate further examples of the electrolyte of my invention as may be used in cells exemplified by those already given above and still others having particular halides as the active material of the cathode.

Another important aspect of my invention resides in the method of preparing the electrolyte thereof whose constituents have been set forth in greater detail above in this specification. More specifically, in respect to the preparation of Lewis acids and their coordinating compounds in various types of solvents, difficulty has been encountered in that the Lewis acids themselves, once placed in solution, have a tendency to coordinate with whatever other compounds may be present; and, in so doing, the Lewis acid may attack the solvent itself. This has been found in some cases to result in breaking down the solvent with undesirable side effects. To overcome this diffi- TABLE I.—ELECTROLYTE COMPOSITIONS FOR CELLS UTILIZING CHLORIDE TYPE CATHODES AND A SATURATOR SALT OF LiCl ADDED TO SATURATION THEREOF IN THE ELECTROLYTE

| Electrolyte designation | Solute and concentration thereof in moles/liter | Coordinating compound and concentration thereof in moles/liter | Solvent and volume percentage thereof in total amount of solvent before addition of salts |
| --- | --- | --- | --- |
| 1 | $AlCl_3$, 1.5 to 2.8 | NaCl, 1.5 to 2.8 | 100% nitromethane. |
| 2 | $AlCl_3$, 1.5 to 3.2 | LiCl, 1.5 to 3.2 | do. |
| 3 | $AlCl_3$, 1.5 to 3.2 | LiCl, 1.5 to 3.2 | 95% to 75% nitromethane; 5% to 25% propylene carbonate. |
| 4 | $AlCl_3$, 1.5 to 2.8 | NaCl, 1.5 to 2.8 | 95% to 75% nitromethane; 5% to 25% propylene carbonate. |
| 5 | $LiClO_4$, 1.0 to 2.5 | None | 100% propylene carbonate. |
| 6 | $LiClO_4$, 1.0 to 2.5 | do | 100% nitromethane. |
| 7 | $LiClO_4$, 1.0 to 2.5 | do | Nitromethane and propylene carbonate in various percentages. |

NOTE.—Above table exemplary of $AlCl_3$ as Lewis acid; satisfactory results may be obtained using comparable values and substituting other Lewis acids such as $BCl_3$, $BF_3$, and $PF_5$ and corresponding coordinating compounds capable of complexing with such acids, e.g. LiF, NaF, KF, LiCl, and KCl.

TABLE II.—ELECTROLYTE COMPOSITIONS FOR CELLS UTILIZING FLUORIDE TYPE CATHODES AND A SATURATOR SALT OF LiF ADDED TO SATURATION THEREOF IN THE ELECTROLYTE

| Electrolyte designation | Solute and concentration thereof in moles/liter | Coordinating compound and concentration thereof in moles/liter | Solvent and volume percentage thereof in total amount of solvent before addition of salts |
| --- | --- | --- | --- |
| 1 | $NaPF_6$, 0.5 to 1.5 | None | 100% propylene carbonate. |
| 2 | $NaPF_6$, 0.5 to 2.5 | do | 90% to 50% propylene carbonate. |
| 3 | $NaPF_6$, 0.5 to 2.5 | do | 100% nitromethane. |
| 4 | $AlCl_3$, 1.5 to 2.8, 2.5 preferred. | NaCl, 1.5 to 2.8, 2.5 preferred. | Do. |
| 5 | $AlCl_3$, 1.5 to 2.8 | NaCl, 1.5 to 2.8 | 5% to 25% propylene carbonate; 95% to 75% nitromethane. |
| 6 | $LiClO_4$, 1.0 to 2.5 | None | 100% nitromethane. |
| 7 | $LiClO_4$, 1.0 to 2.5 | do | 100% propylene caronate. |
| 8 | $LiClO_4$, 1.0 to 2.5 | do | Nitromethane and propylene carbonate in various percentages. |
| 9 | $LiPF_6$, 0.5 to 2.5 | do | 100% nitromethane. |
| 10 | $LiPF_6$, 0.5 to 2.5 | do | 5% to 25% propylene carbonate; 95% to 75% nitromethane. |
| 11 | $LiPF_6$, 0.5 to 1.5 | do | 100% propylene carbonate. |

To further illustrate additional aspects of my invention, the following are lists of typical cathodes and corresponding saturator salts which may be employed depending upon the selection of anode for the particular cell under consideration.

TABLE III.—SATURATOR SALTS FOR USE WITH ANODES SHOWN OPPOSITE THERETO IN THIS TABLE AND CATHODES ASSOCIATED WITH SUCH ANODES AS INDICATED BY THE GROUPS THEREOF SHOWN BRACKETED

| Cathode | Anode | Saturator Salt |
| --- | --- | --- |
| $CuF_2$ | | |
| $AgF$ | | |
| $AgF_2$ | Li | LiF |
| $CoF_2$ | Na | NaF |
| $CoF_3$ | Ca | $CaF_2$ |
| $NiF_2$ | Mg | $MgF_2$ |
| $FeF_2$ | | |
| $FeF_3$ | | |
| $CuCl_2$ | | |
| $AgCl$ | Li | LiCl |
| $CoCl_2$ | Na | NaCl |
| $NiCl_2$ | Ca | $CaCl_2$ |
| $FeCl_2$ | Mg | $MgCl_2$ |
| $FeCl_3$ | | | culty and to achieve other advantages, I have found the following procedure for preparing the electrolyte of my invention to be particularly advantageous.

First, having selected the particular solvent to be used, comprising either one or more of the non-aqueous solvents described hereinabove, a predetermined amount of appropriate coordinating compound, such as sodium chloride, is suspended or partially dissolved therein.

Second, the particular Lewis acid to be utilized is then added. If the acid is a gas, such as $BCl_3$ or $BF_3$, it is bubbled through the solution until the desired amount is dissolved therein; if the material is a solid, such as $AlCl_3$, then the solid in suitable form such as a powder, crystals, or the like, is added in the proper amount, removing any excess salt thereafter which may be present. By the foregoing steps of preparing the solution first with a coordinating compound, even though it may not completely dissolve when added first, before adding the Lewis acid, I achieve one of the advantages of my novel method of my invention which is that the Lewis acid, when added to the solvent preparation, does not attack the solvent; but rather the Lewis acid then begins to coordinate immediately with the coordinating compound already present and ready to interact with the Lewis acid.

Third, the saturator salt is added, either at the same time or immediately after the solute-solvent solution is heated up to below the boiling point of the solvent of the mixture. Such addition of saturator salt is made over an extended time period, up to 24 hours, while the mixture is agitated, stirred, or otherwise made to increase the amount of saturator salt dissolved therein.

Although I have described the aforementioned method of preparing the electrolyte of my invention in terms of particular Lewis acids, it is understood that the techniques may be used with a wide variety thereof and with any one of the saturator salts described or indicated hereinabove.

I claim:

1. A rechargeable electrochemical cell wherein the active anode material is a metal selected from the group consisting of lithium, sodium, calcium, and magnesium and the active cathode material is a halide of a metal selected from the group consisting of copper, silver, iron, nickel, and cobalt, said cell having a non-aqueous electrolyte comprising:

a solute which is a Lewis acid of the class having a metal cation of an element selected from the group consisting of Al, B, and P, and a halide anion, said Lewis acid concentration being in the range of 1.5 to 2.8 moles per liter;

a coordinating compound comprising a halide salt capable of forming a complex with the selected one of said Lewis acids, said coordinating compound being selected from the group consisting of simple salts of sodium, lithium, and potassium, and having a halide anion of the same specie as the halide anion of the selected one of said Lewis acids, said coordinating compounds having at least the same mole per liter concentration as said Lewis acid;

a saturator salt which is a metal halide having a cation of the same specie as said active anode material and an anion of the same specie as the halide of said active cathode material, said saturator salt being present in sufficient quantity to form a saturated solution thereof in said electrolyte; and a non-aqueous solvent for said solute, coordinating compound, and saturator salt, said solvent comprising at least one member selected from the group consisting of nirtomethane, nitroethane, nitropropane, propylene carbonate, and butyro-lactone.

2. The cell in accordance with claim 1 wherein said solvent also contains propylene carbonate in the range of 5 percent to 25 percent by volume of the total amount of said solvent.

3. A rechargeable electrochemical cell wherein the active anode material is a metal selected from the group consisting of lithium, sodium, calcium, and magnesium and the active cathode material is a halide of a metal selected from the group consisting of copper, silver, iron, nickel, and cobalt, said cell having a non-aqueous electrolyte comprising:

a solute selected from the group consisting of salts having a cation selected from the group consisting of Li, Na, K, Mg, and Ca, and an anion selected from the group consisting of perchlorate and the ion formed by a Lewis acid in coordination with a simple halide anion of the same specie as the halide of said Lewis acid, said Lewis acid having a metal cation selected from the group consisting of Al, B, and P;

a saturator salt which is a metal halide having a cation of the same specie as said active anode material and an anion of the same specie as the halide of said active cathode material, said saturator salt being present in sufficient quantity to form a saturated solution thereof in said electrolyte; and a non-aqueous solvent for said solute and saturator salt said solvent comprising at least one member selected from the group consisting of nitromethane, nitroethane, nitropropane, propylene carbonate, and butyro-lactone.

4. The cell in accordance with claim 3 characterized by said active anode material being lithium and wherein said solute is $LiClO_4$ having a concentration in the range of 0.5 to 2.5 moles per liter; and said solvent is nitromethane.

5. The cell in accordance with claim 3 characterized by said active anode material being lithium and wherein said salute is $LiClO_4$ having a concentration in the range of 0.5 to 2.5 moles per liter; and said solvent is propylene carbonate.

6. The cell in accordance with claim 3 characterized by said active anode material being lithium and wherein said solute is $NaPF_6$ having a concentration in the range of 0.5 to 1.5 moles per liter; and said solvent is propylene carbonate.

7. The cell in accordance with claim 3 characterized by said active anode material being lithium and wherein said solute is $NaPF_6$ having a concentration in the range of 0.5 to 2.5 moles per liter; and said solvent is nitromethane.

8. The cell in accordance with claim 3 wherein said solvent also contains propylene carbonate in the range of 50 percent to 90 percent by volume of the total amount of said solvent.

9. The cell in accordance with claim 3 characterized by said active anode material being lithium and wherein said solute is $LiPF_6$ having a concentration in the range of 0.5 to 2.5 moles per liter.

10. The cell in accordance with claim 3 wherein said solvent is nitromethane.

11. The cell in accordance with claim 3 characterized by said active anode material being lithium and wherein further said solute is $LiPF_6$ having a concentration in the range of 0.5 to 1.5 moles per liter; and said solvent is propylene carbonate.

References Cited

UNITED STATES PATENTS

| | | | |
|---|---|---|---|
| 3,073,884 | 1/1963 | Pinkerton | 136—155 XR |
| 3,098,770 | 7/1963 | Horowitz et al. | 136—153 XR |
| 3,368,926 | 2/1968 | Toy | 136—155 |
| 3,380,855 | 4/1968 | Mahy et al. | 136—155 XR |
| 3,393,093 | 7/1968 | Shaw et al. | 136—155 XR |

WINSTON A. DOUGLAS, Primary Examiner

D. L. WALTON, Assistant Examiner

U.S. Cl. X.R.

136—154, 155